US012748398B1

(12) United States Patent
de Melo et al.

(10) Patent No.: US 12,748,398 B1
(45) Date of Patent: Sep. 29, 2026

(54) HIGH SPEED COMMUNICATION WITH MICROPROCESSORS

(71) Applicant: Tractian Technologies Inc, Atlanta, GA (US)

(72) Inventors: Iago Daniel Florencio de Melo, São Paulo (BR); Kimon Pediatidakis, São Paulo (BR); Willian Löschner, Osasco (BR)

(73) Assignee: Tractian Technologies Inc, Atlanta, GA (US)

( * ) Notice: Subject to any disclaimer, the term of this patent is extended or adjusted under 35 U.S.C. 154(b) by 0 days.

(21) Appl. No.: 19/411,550

(22) Filed: Dec. 8, 2025

(51) Int. Cl.
*G05B 19/042* (2006.01)

(52) U.S. Cl.
CPC ..... *G05B 19/0423* (2013.01); *G05B 19/0421* (2013.01)

(58) Field of Classification Search
CPC ........................ G05B 19/0423; G05B 19/0421
See application file for complete search history.

(56) References Cited

U.S. PATENT DOCUMENTS

2013/0203466 A1* 8/2013 Chen ................. H04M 1/72403 455/558
2023/0080059 A1* 3/2023 Hemkumar ........... G06F 9/4401 713/2
2025/0261303 A1* 8/2025 Kiley ..................... H01R 12/72

FOREIGN PATENT DOCUMENTS

EP 4432091 A1 * 9/2024 ............. G06F 30/33

* cited by examiner

*Primary Examiner* — Cheikh T Ndiaye
(74) *Attorney, Agent, or Firm* — Cognition IP, P.C.; Edward Steakley; Saleh Kaihani

(57) ABSTRACT

Wireless monitors can be attached or affixed to industrial machines in a plant to collect machine data, and transmit machine data to a maintenance and monitoring infrastructure. The machine data can be analyzed with failure analysis models to generate diagnostics and failure predictions, and to monitor the health of industrial assets in the plant. The wireless monitors can include microprocessors to control the operations of the device. A plurality of microprocessors can be flashed and batch-tested before assembling them into the sealed wireless monitors. Interfaces and protocols, for flashing and/or debugging the microprocessors of the wireless monitors, can include two single-ended signal interface and protocol layers, coupled with an intermediary differential signal interface and protocol layer.

20 Claims, 7 Drawing Sheets

HIGH SPEED COMMUNICATION WITH MICROPROCESSORS

BACKGROUND

Field

This invention relates generally to the field of inter-device communication, and more particularly to communication from a host computer to a microprocessor.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Industrial plants can include numerous mechanical machines with thousands of moving parts. Industrial machines can be monitored for maintenance purposes. Monitoring can include a trained technician visually inspecting the machines, observing the machine operations, and listening for any abnormal auditory cues that can indicate a present or potential maintenance-related fault in the machines. The technicians can also perform more sophisticated diagnosis, using maintenance and diagnostic tools. Continuous monitoring of industrial machines can present operational inefficiencies and cost to an industrial plant, particularly as the number of machines can be substantial in an industrial plant. For these and similar reasons, plants or busy shops with mechanical machines can benefit from an automated maintenance infrastructure. The automatic maintenance infrastructure can continuously collect maintenance-related data from various machines, detect maintenance-related events, and recommend appropriate action.

Portable, wireless, battery-operated monitors can capture machine data and wirelessly transmit the machine data upstream for artificial-intelligence-based processing. The wireless monitors can include a microcontroller or microprocessor that oversee the operations of the monitor. The microcontrollers need initialization, debugging and verification before the monitors are assembled and sealed. Existing interfaces and protocols for interfacing with the microcontrollers can include limitations, preventing or reducing the possibility of initializing and verifying a large collection of microprocessors, in parallel, to improve the efficiency of production of the wireless monitors. Limitations of the existing interfaces and protocols can include communication speed affecting the length of time required to initialize and verify each microprocessor, potential for noise corruption of the communication required to carry out initialization and verification, as well as other limitations. Consequently, there is a need for more robust interfaces and protocols to initialize, debug and verify a large collection of microprocessors of the wireless monitors, more efficiently.

SUMMARY

The appended claims may serve as a summary of this application. Further areas of applicability of the present disclosure will become apparent from the detailed description, the claims, and the drawings. The detailed description and specific examples are intended for illustration only and are not intended to limit the scope of the disclosure.

BRIEF DESCRIPTION OF THE DRAWINGS

These drawings and the associated description herein are provided to illustrate specific embodiments of the invention and are not intended to be limiting.

DETAILED DESCRIPTION

Figure 1A:
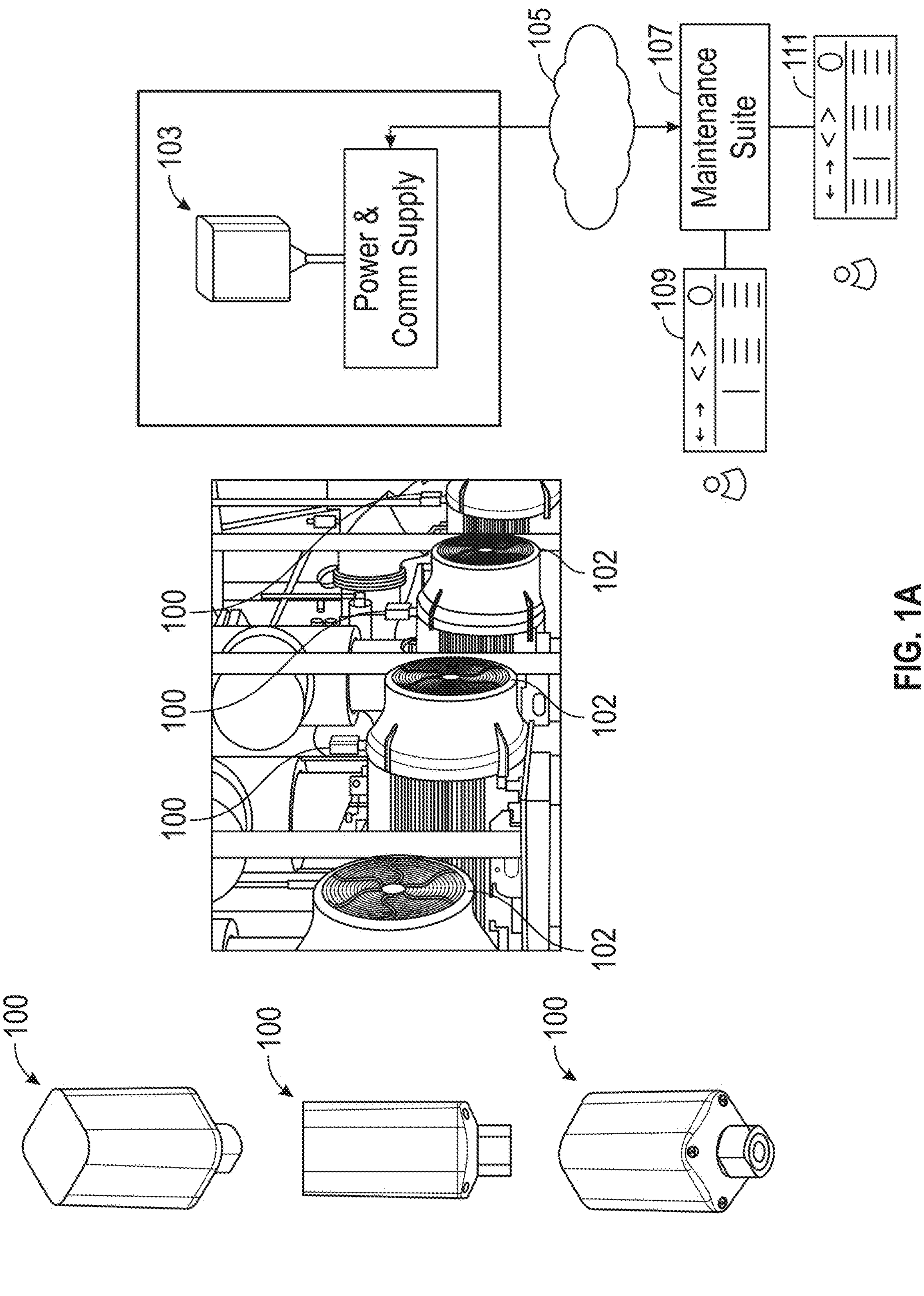
FIG. 1A illustrates example diagrams of monitors, industrial machines, and an infrastructure of fault monitoring and maintenance operations according to some embodiments.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements. Some of the embodiments or their aspects are illustrated in the drawings.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Industrial machines can benefit from consistent and accurate fault monitoring with artificial intelligence processing of the monitored data. In some embodiments, a plurality of small monitor assemblies, each equipped with wireless communication circuitry can be attached to various industrial machines in a plant. The monitors can sense and report various operational parameters related to fault monitoring. For example, temperature and vibration can be monitored and reported. The quality of vibrations, vibration trend data and other characteristics can be indicators of fault occurring or developing in an industrial machine. Similarly, temperature and temperature trends of a machine can include indicators of occurring or upcoming faults in the machine. Other parameters can also be collected and monitored.

FIG. 1A illustrates example diagrams of a monitor 100, industrial machines 102, and an infrastructure of fault monitoring and maintenance operations according to some embodiments. The monitor 100 can be battery operated and can include a variety of sensing components enclosed in a housing. The monitor 100 can attach to machines 102 in the plant using a magnetic connection and/or by using other methods of attachment and fastening to secure the monitors 100 to machines 102 in the plant. The attachment of the monitors 100 to machines 102 can depend on the magnitude of the vibrations and other considerations related to the environment of the machines 102 and the plant. For example, if larger magnitude vibrations are expected, the connection between the monitors 100 and the machines 102 can be secured with an adhesive agent, so the monitors 100 can maintain their connections to the machines 102, despite large vibrations.

The monitors 100 can include wireless communication circuitry and can be in wireless communication with one or more receivers 103. In some embodiments, one or more monitors 100 can be modified to be in wired communication with a receiver 103 and have a connection to an outlet source of power. In other words, the source of power and type of communication of the monitors 100 can be modified, depending on the application and the environment of the plant to include any combination of battery-operated, outlet-operated, wired communication, and wireless communication. Similarly, the receivers 103 can include both wired and wireless communication circuitry. The receivers 103 can also be powered with or without the use of a battery. In some embodiments, both the monitors 100 and the receivers 103 can wirelessly communicate to a portable computer, such as a laptop, a smart phone, a smart tablet, or other portable devices, in the field, using a local or cellular wireless network. Although the term receiver is used, the receivers can also send data to monitors 100. Consequently, receivers 103 can be transceiver devices. For example, a receiver 103 can send a configuration file to a monitor 100 to enable, disable or otherwise configure various operating parameters of the monitor 100.

The numbers and locations of the receivers 103 can depend on the size of the plant and then numbers and distances of the monitors 100, relative to the receiver 103 and the wireless communication technology used to communicate between the monitors 100 and the receiver 103. The receivers 103 can be mounted at various locations in a plant and can have connection to a power and a communication source. For example, the receivers 103 in a plant can be in wired and/or wireless communication to one or more communication portals 105. Example communication portals 105 can include a local network, the Internet, one or more cloud infrastructures, gateways, other receivers 105, and other communication midpoints, or endpoints. The receivers 103 can transmit the fault monitoring data for upstream processing. The receivers 103 can also receive various operational configuration files, settings files, and/or other operating parameters and can transmit the operating parameters to the monitors 100. Examples operating parameters can include various timing and frequency of when and how the monitors 100 should collect data from the machines 102.

A maintenance suit 107 can receive monitoring data from the monitors 100 and perform processing related to fault monitoring and maintenance operations on the data. The maintenance suite 107 can include a variety of submodules and databases that can support processing of the monitoring data, including, storage of the data, generating reports from the data, extracting trends from the data, generating fault prediction from the data, generating maintenance action items, tickets, generating alerts, and/or other automated actions related to the maintenance of the machines 102. In some embodiments, the operations of the maintenance suite 107 can include artificial-intelligence submodules that can assist in fault prediction, maintenance recommendation pattern and trend detection, and other data analytics action, augmented or generated by artificial intelligence models. Example artificial intelligence techniques and/or models used by maintenance suite 107 can include neural networks, deep neural networks, machine learning, convolutional neural networks (CNNs), random forests, and others.

The maintenance suite 107 can support a variety of user interfaces (UIs). For example, the maintenance suite 107 can support a frontend user interface 109 and a backend user interface 111. Various parameters related to the operation of the monitors 100 can be viewed and/or modified via the user interfaces 109, 111. The user interfaces 109, 111 can provide access for a user to generate or modify configuration files, settings and operating parameters for the monitors 100 and the maintenance suite 107. The users can also view the output of the maintenance suite 107 via the user interfaces 109, 111.

While not shown, the monitors 100 are not the only maintenance-related in-field components operated by the maintenance suite 107. Other components associated with monitoring and maintenance of the machines 102 and the plant can also be in communication with the maintenance suite 107. For example, in some embodiments, energy management components in communication with the maintenance suite 107, can monitor the power consumption of the machines 102 and/or the plant.

Depending on the size of an industrial plant, the monitors 100 can be numerous, for example in the hundreds or thousands. The maintenance suite 107 can streamline and track data from hundreds or thousands of machines and automate the identification and tracking of maintenance-related tasks for a large industrial plant, having hundreds or thousands of machines 102.

Figure 1B:
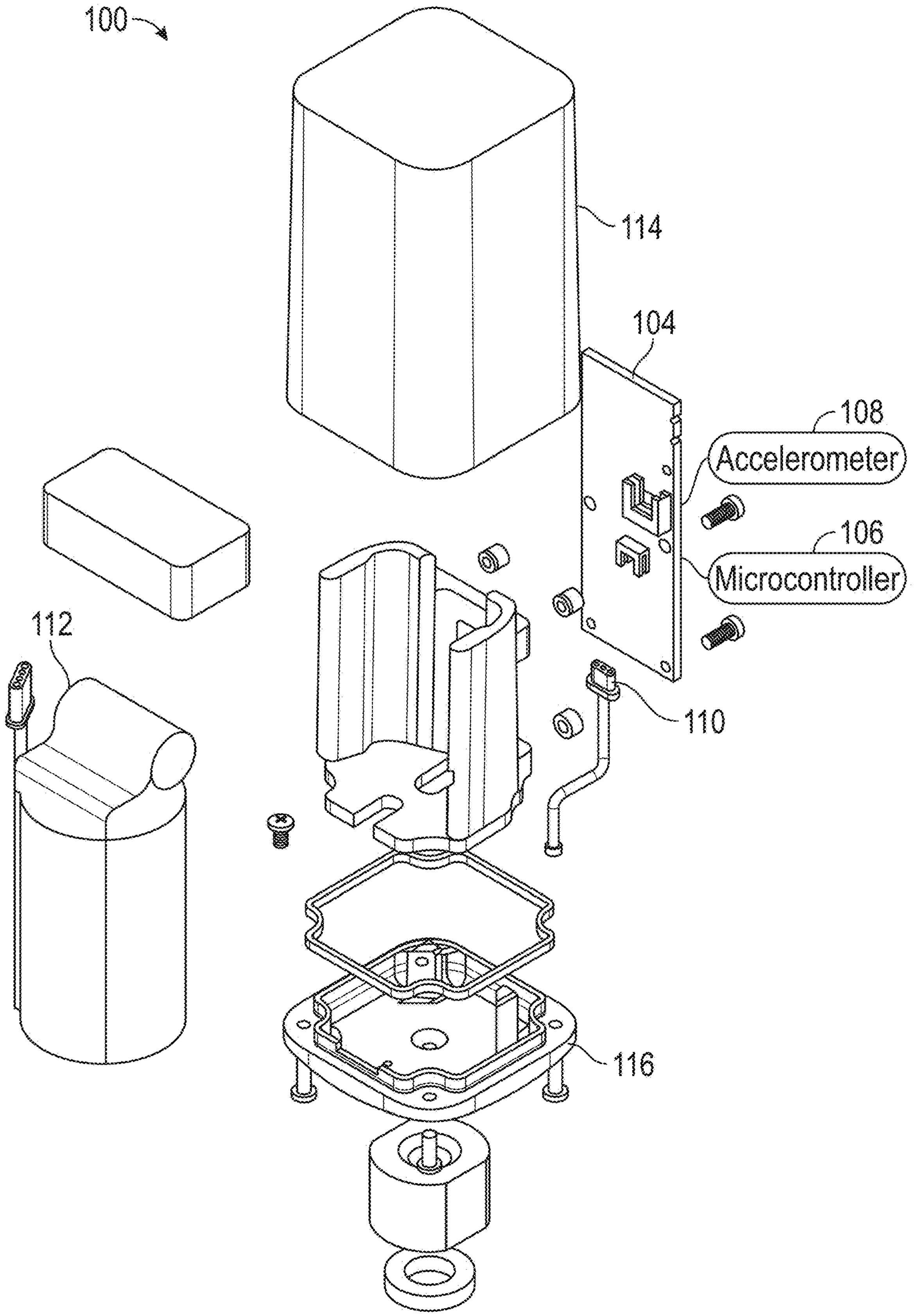
FIG. 1B illustrates an exploded view of an example monitor, according to an embodiment.

FIG. 1B illustrates an exploded view of an example monitor 100. Some example components include the printed circuit board (PCB) 104, the microcontroller 106, an accelerometer 108, a temperature sensor 110, a battery module 112, various spacers, holders, internal conduits, and a housing 114. In some embodiments, the monitor 100 can include a magnetometer. Various technologies of magnetic field measurement can be used, including scalar or vector magnetometers. Various technologies of magnetic field measurement can be used, including scalar or vector magnetometers.

In some embodiments, the monitor 100 can include piezo elements, capable of measuring ultrasonic vibrations, which can assist in detecting lubrication failures and related maintenance problems. The housing 114 can house the internal components of the monitor 100. A housing lid 116 can enclose the housing 114 and seal the internal components of the monitor 100 from the outside. The monitor 100 can be made water-, dust- and particle-resistant by a variety of techniques. For example, in some implementations, the monitor 100 can be resin-coated. The battery module 112 can include one or more lithium-ion batteries, and a battery management system (BMS). In other embodiments, the BMS can be external to the battery module 112, for example, it can be mounted on the PCB 104. In some embodiments, the life expectancy of the battery module 112 can be between three to five years.

The monitor 100 can include communication circuitry, corresponding to the communication circuitry of one or more receivers, for example, the receivers 103, and one or more local, private and/or public communication network, including one or more cellular networks. The choice of network and communication circuitry can depend on the size of the plant and the distance of the monitor 100 from a receiver 103. The communication circuitry of the monitor 100 can be mounted on the PCB 104. In some embodiments, the communication circuitry may be integrated in the microcontroller 106. Similarly, in other embodiments, various components can be combined into one or use a component that integrates several components together. The monitor 100 can include a magnetic collar to provide magnetic attachment between the monitor 100 and the machine 102. In some embodiments, the temperature sensor 110 can be routed to a surface very near the point of contact between the monitor 100 and the machine 102 to provide a more accurate reading of the temperature of the machine 102.

The accelerometer 108 can be a micro-electro-mechanical system (MEMS) accelerometer, capable of one, two, or three axis acceleration data. For example, in some embodiments, the accelerometer 108 can measure forces in three directions along the XYZ axes. The microcontroller 106 can receive the acceleration data, for example, as a function of time, from the accelerometer 108, and can generate spectral data of the vibrations of a machine 102.

The microcontroller 106 can be a collection of various components, including computer or computing components. Example components of the microcontroller 106 can include a processor, such as a central processing unit (CPU), permanent and impermanent memory, including for example, random access memory (RAM) of various kinds, solid state, flash or other permanent memory, interconnects, buses and communication vias between the various components. In some embodiments, the microcontroller 106 can include external communication circuitry to enable wireless communication, including radio frequency identification (RFID), Bluetooth, cellular, or other communication technologies. In other embodiments the monitor 100 can include dedicated wireless communication circuitry, fabricated or included in the monitor 100, in a separate component than the microcontroller 106.

The monitors 100 can be configured to spend the majority of their time in hibernation state to conserve battery power. In hibernation mode, the power to all or some of the components of the monitor 100 can be reduced or minimized, thereby reducing the overall battery consumption in the hibernation state. The monitors 100 can be configured to periodically exit hibernation mode and enter normal operation mode, where power and functionality to some or all components is restored. For example, the monitors 100 can perform periodic sampling of various operational parameters of the machines 102, such as temperature and vibrations. When scheduled sampling is not performed, the monitors 100 can be in hibernation mode.

The monitors 100 can perform a variety of samplings of machine operation parameters. For example, for the vibration parameter of the machines 102, the monitors 100 can perform various samplings at different intervals and with different characteristics. Example sampling characteristics can include sampling intervals, sampling frequency, sampling range, sampling resolution and other characteristics. Sampling interval can refer to the period by which the monitor 100 turns on and performs a sampling with a selected set of sampling characteristics. In some embodiments, the monitors 100 can be configured to perform scheduled sampling sessions, which are samplings performed at selected intervals. The selected intervals can depend on the type of machines 102 and other factors that are application-dependent, based on where the monitors 100 are used. Example sampling intervals can include sampling with intervals separated by minutes, hour or hours, days, or even months, and other intervals.

The monitor 100 is a battery-operated device. In most applications extending the longevity of the monitor 100 is proportional to the longevity of the battery module 112. A significant portion of the battery consumption of the monitor 100 relates to the transmission of data to the receiver 103. At the same time, typical industrial environments of the monitor 100 and the receiver 103 can present challenges for wireless transmission of data between the two devices. For example, industrial environments can introduce substantial noise and interference to wireless transmission of data between the two devices. Various wireless communication frameworks exist and can be utilized for transfer of data. A wireless communication framework can provide a basic level of functionality between transmission nodes. Referencing the open systems interconnection (OSI) model, various existing wireless communication frameworks can provide some of the functionality for wireless transmission of data between a monitor and a receiver. For example, an existing wireless communication framework can provide a physical layer for wireless transmission of data between the monitor and the receiver, using radio waves.

The monitor 100 is but one example device, which can be used in a maintenance and monitoring infrastructure. Other devices may also be used. For example, some industrial machines 102 can include an integrated sensor, which reports on the operational parameters of the machine. the monitors 100 can alternatively be referred to as sensors.

During the assembly of the monitor 100, the microcontroller 106 and other components can be configured and tested, before enclosing the housing 114 and sealing the monitor 100. In the case of the microcontroller 106, initialization processes, as part of the assembly, can include flashing the microcontroller 106 with firmware, debugging the firmware, and verifying satisfactory operations of the components and processes therein. Flashing of the microcontroller can include loading firmware into a permanent memory of the microcontroller, for example its flash memory. Flashing can be performed with a physical interface layer and a communication protocol, compatible with the microcontroller 106.

Figure 2:
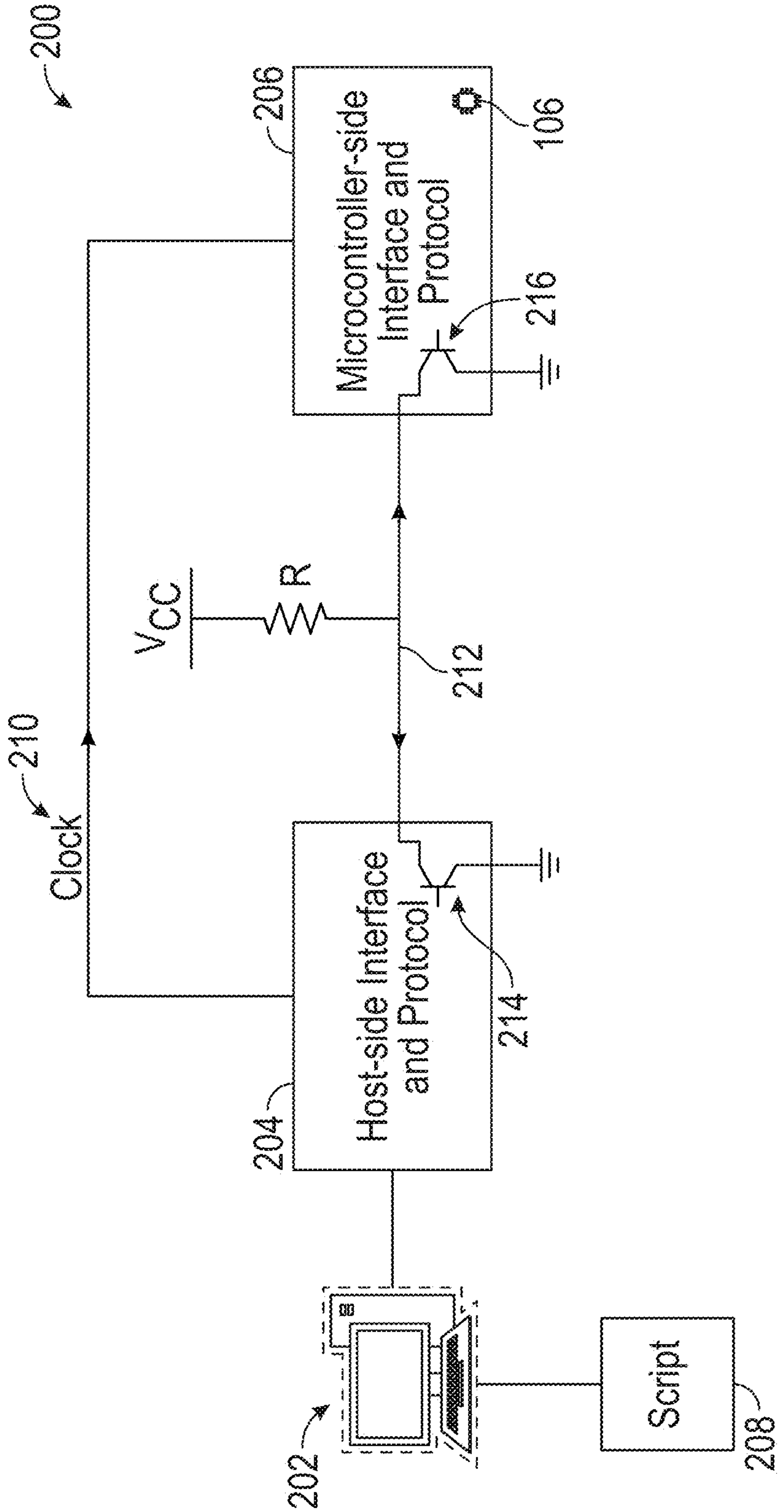
FIG. 2 illustrates an example diagram of a setup for flashing a microcontroller.

FIG. 2 illustrates an example diagram of a setup 200 for flashing a microcontroller 106. The setup 200 can include a host 202, a host-side interface and protocol layer (HIPL) 204 and a microcontroller-side interface and protocol layer (MIPL) 206. The HIPL 204 and MIPL 206 can also be implemented with microcontrollers. An example of the HIPL 204 and MIPL 206 can include a single wire debug (SWD) interface. The host 202 can run a script 208 (e.g., a Python script) that can include firmware instructions for the microcontroller 106. The host 202 can drive a clock signal 210, going from the HIPL 204 to the MIPL 206. In addition to the clock signal 210, the HIPL 204 and MIPL 206 can share a single input/output (I/O) wire 212. The process of flashing the microcontroller 106 can include two way communication between the host and the microcontroller 10, via the wire 212. The host can message the microcontroller 106 by pulling the voltage of the wire 212 to the ground, via transistor 214. By turning the transistor 214 on/off, using the clock signal 210, the host can send digital messages to the microcontroller 106. Similarly, the microcontroller 106 can send digital messages to the host by pulling the voltage of the wire 212 to ground, via a transistor 216. In some implementations, the transistors 214, 216 can be implemented with bipolar junction transistors (BJTs) or by metal-oxide semiconductor field effect transistors (MOSFETs). The setup 200 and the HIPL 206, MIPL 206 utilize an open-collector, or open-drain configuration to make two-way communication possible via a single wire 212. In other words, some interface and communication protocols for flashing the microcontroller 106 can require an open-collector, open-drain configuration to enable messaging between the host 202 and the microcontroller 106.

In some implementations, the PCB 104 and components therein can be tested in bulk. For example, in production environments, where thousands of monitors 100 are manufactured in bulk, hundreds or thousands of PCBs 104 and components therein are tested and verified in bulk. Hundreds or thousands of microcontrollers 106 can also be flashed in bulk and in parallel. The flashing process using a single wire 212 and the HIPL 204, MIPL 206 can be difficult to scale in large production environments. The single wire setup can be highly sensitive to noise. For example, in the setup 200, the wire 212 has to be a relatively short wire (only a few centimeters) to reduce or minimize the environmental noise that can corrupt the communication between the host 202 and the microcontroller 106. This limitation can be incompatible with large-scale flashing of hundreds or thousands of microcontrollers 106, in parallel, where wires of several meters may be needed to reach a host 202 to one or more microcontrollers 106. Another limitation of the single wire setup is flashing speed. A single wire setup can take one to two minutes to flash a single microcontroller 106. The described embodiments include an improved flashing setup, which can improve the efficiency of flashing speed (e.g., down to four to six seconds per microcontroller 106), as well as allow for usage of long wires between a host 202 and a batch of microcontrollers 106.

Figure 3:
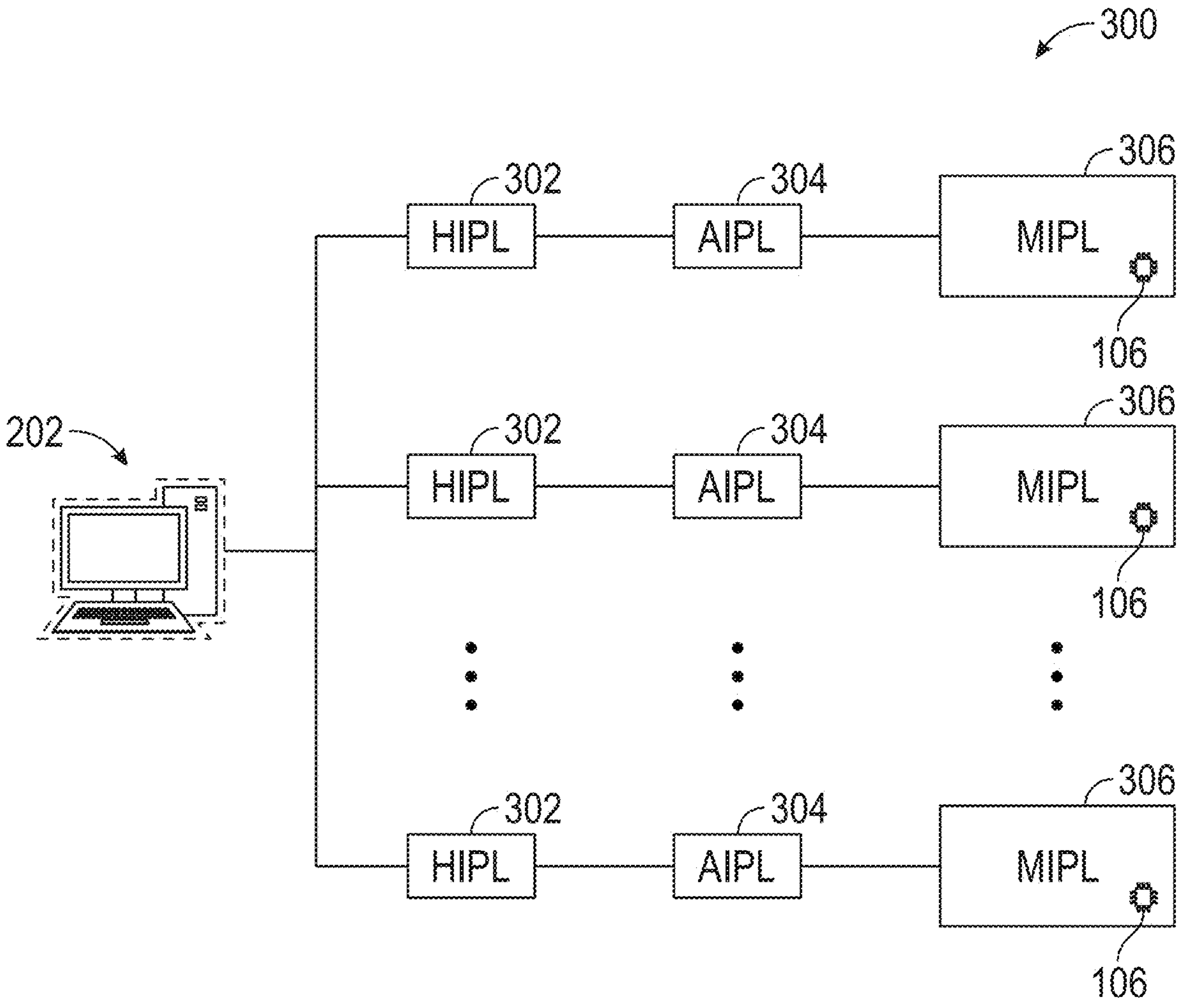
FIG. 3 illustrates a diagram of an example setup for flashing a large number of microcontrollers in a production environment, according to some embodiments.

FIG. 3 illustrates a diagram of an example setup 300 for flashing a large number of microcontrollers 106 in a production environment, according to some embodiments. The setup 300 can be a part of initialization, debugging and verification of multiple PCBs 104 and components therein. The host 202 can interface and communicate with the components on PCBs 104, via interfaces and protocols 302, 304, 306 to perform initialization, debugging, and verification. The PCBs that pass the verification stage can move forward in the assembly process and be packaged as monitors 100. Similar to setup 200, interfaces and protocols 302, 304, 306 can include a host-side interface and protocol layer (HIPL) 302 and a microcontroller-side interface and protocol layer (MIPL) 306. In scenarios where the HIPL 302 and MIPL 306 are less robust for large-scale deployment in a production environment, an auxiliary interface and protocol layer (AIPL) 304 can be used, according to the described embodiments. For example when a single-wire signaling protocol is used or required to flash the microcontrollers 106 (e.g., SWD), limitations, incompatible with a large-scale usage of the signaling protocol can be introduced. For example, the length of the wire between the host 202 and the microcontrollers 106 can only be limited to a few centimeters, the communication between the two can be more prone to corruption by noise, and the time required for flashing each microcontroller 106 can be substantial.

The AIPL 304 can address the limitations above when implemented by a robust interface and protocol. For example, differential-signal-based interface and protocol can make the communication between the host 202 and the microcontroller 106 more resistant to noise corruption, allowing for usage of longer length wires (e.g., twisted wires of several meters) and substantially reducing the flashing time of each microcontroller 106. In some embodiments, the AIPL 304 can be implemented with low voltage differential signaling (LVDS). In some embodiments, the AIPL 304 is an intermediary interface and protocol layer between the HIPL 302 and the MIPL 306.

Figure 4:
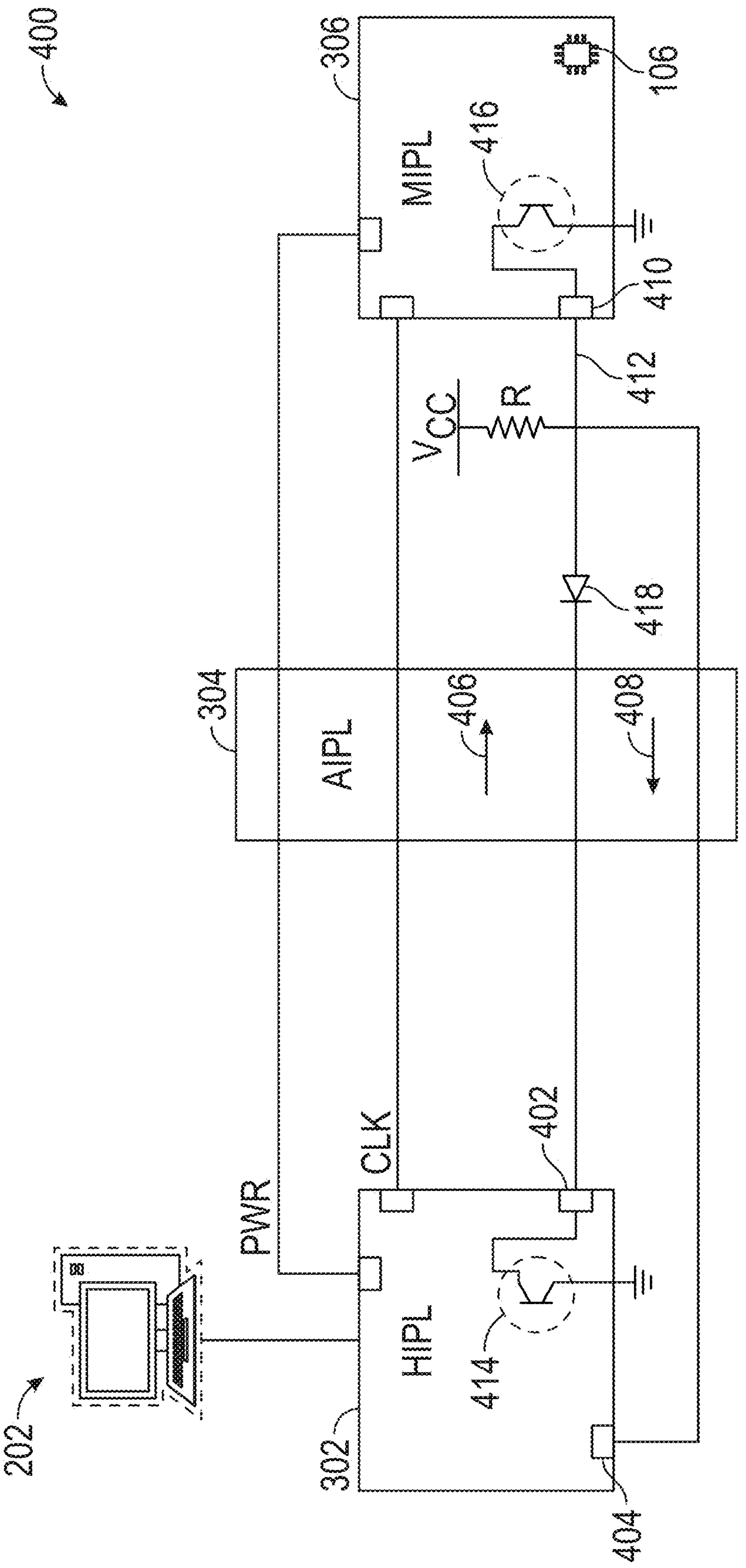
FIG. 4 illustrates a block diagram of a microcontroller flashing setup, according to an embodiment.

FIG. 4 illustrates a block diagram of a microcontroller flashing setup 400, where an AIPL 304 is used to improve the communication and scalability of a pair of HIPL 302 and MIPL 306. The HIPL 302 can be implemented in a microcontroller, using a communication protocol compatible with the microcontroller 106, such as SWD. Referring to both FIGS. 2 and 4, the HIPL 302, instead of having only a single I/O wire 212, can be implemented to separate the input and output signals into their respective pins, while still using the SWD interface and protocol. For example, the microcontroller implementing the HIPL 302 can assign an HIPL output pin 402 for messages sent from the host 202 to the microcontroller 106 and can assign an HIPL input pin 404 for messages sent from the microcontroller 106 to the host 202. In this configuration, a bidirectional flow of information between the host 202 and the microcontroller 106 can be established. Information or communication from the host 202 to microcontroller 106 can flow in the direction 406 and the information or communication from the microcontroller 106 to the host 202 can flow in the direction 408. The clock and power supply lines can also be implemented by and through each layer. In other words, the clock signal can also be transmitted via the AIPL 304 to perverse the robustness of the clock signal. When only HIPL 302 and MIPL 306 are used, they share power supply lines. In some implementations, all layers, including the AIPL 304 share and are on the same power supply lines. However, a benefit of the described embodiments, when using the AIPL 304 is that the layers can be powered independently.

The MIPL 306 can be implemented in a microcontroller, using a communication protocol compatible with the microcontroller 106, such as a SWD. The microcontroller, implementing the MIPL 306, can assign a single input/output MIPL pin 410 to both send and receive communication to and from the microcontroller 106. The microcontroller implementing the MIPL 306 is in communication with the microcontroller 106 to perform flashing and debugging operations.

While the AIPL may be a unidirectional interface and protocol layer, the arrangement implemented in the described embodiments can allow for robust bidirectional communication between the host 202 and the microcontroller 106. A pullup circuit (e.g., a resistor R connected to a high voltage Vcc) can connect the wire 412 to a high voltage (logic "1"). The host 202 can pull down the voltage on the wire 412 to the ground (logic "0") to send digital messages to the microcontroller 106, for example by turning on a transistor 414 and having current flow through the diode 418. The microcontroller 106 can use the input/output MIPL port 410 to read those digital signals. The microcontroller 106 can pull down the voltage on the wire 412 to ground (logic "0"), to send digital messages to the host 202 by cycling the transistor 416 on and off, based on the clock signal. In this manner, the host 202 can use the HIPL input pin 404 to sense digital signals on wire 412.

The host 202 can send messages to the microcontroller 106, in part by making the diode 418 conductive, by placing a low voltage (logic "0") on the wire 412, for example by turning on the transistor 414. When the host turns off the transistor 414, the voltage on the wire 412 is pulled up to a high voltage (logic "1"), via the pullup circuit R, Vcc. In this manner, the host 202 can send digital messages to the microcontroller 106, via the wire 412 and the input/output MIPL pin 410, by cycling the transistor 414 on and off, based on the clock signal. The HIPL input pin 404 can be connected to the wire 412 on the positive terminal side of the diode 418 to allow the HIPL 302 to read the digital messages from the microcontroller 106.

Figure 5:
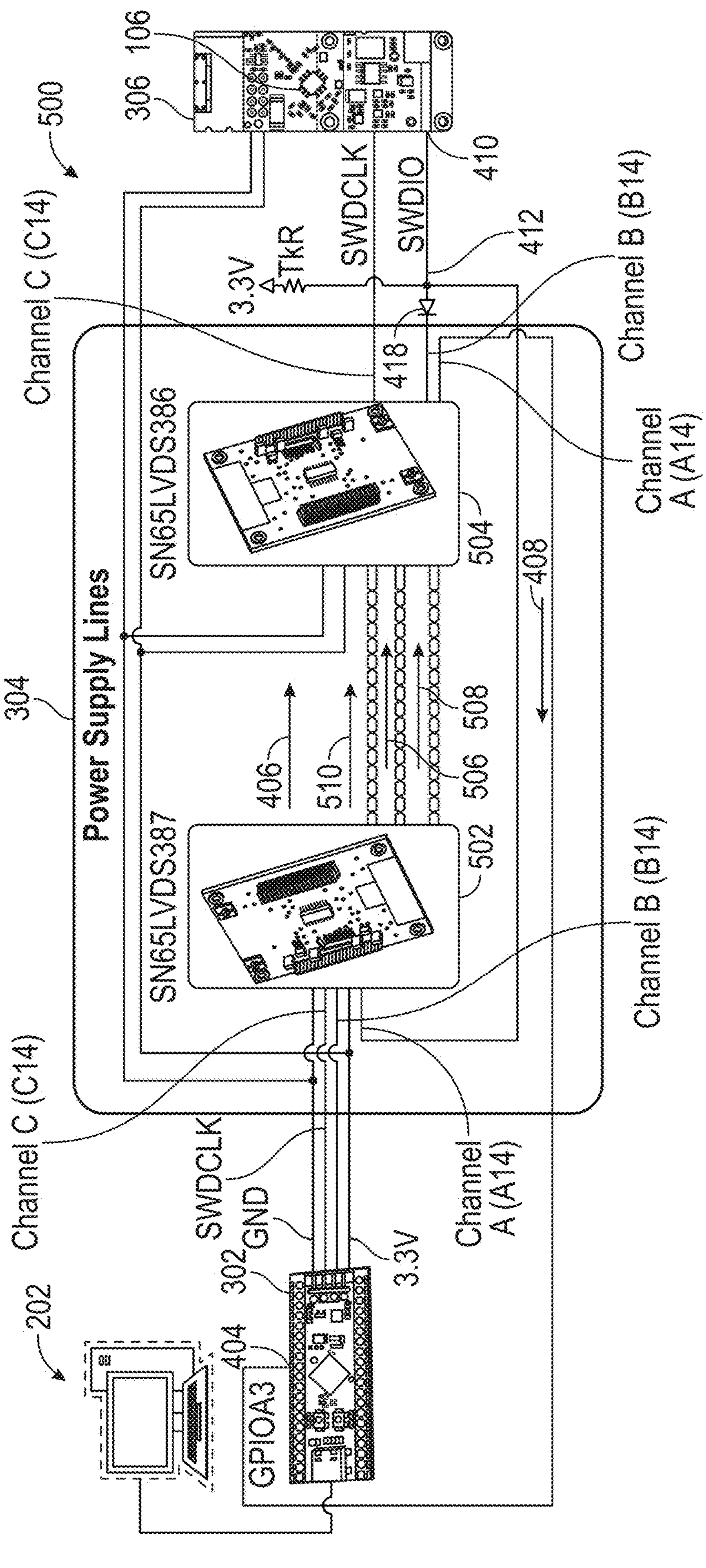
FIG. 5 illustrates an example diagram of a flashing setup, based on the flashing setup of the embodiment of FIG. 4.

FIG. 5 illustrates an example diagram of a flashing setup 500, based on the flashing setup of the embodiment of FIG. 4. Example components, connections and signals are shown, when the HIPL 302 and MIPL 306 are implemented with SWD and the AIPL is implemented with LVDS. The components and connections are provided as examples. Persons of ordinary skill in the art can utilize different technologies, without departing from the spirit of the disclosed technology.

The AIPL 304 can include a sender board 502 and a receiver board 504. The HIPL 302 and MIPL 306 are of collector-type input, utilizing transistor-transistor logic (TTL). The AIPL 304 may not inherently include bidirectional communication components and protocols. A sender board 502 can be used to send information and a receiver board 504 can be used to receive information, thereby establishing bidirectional communication between the host 202 and the microcontroller 106. The AIPL 304 can receive single-ended communication lines and convert their single-ended signals to differential pairs for more robust transmission.

The HIPL 302 can receive a Python flashing and/or debugging script and convert it to a protocol compatible with the microcontroller 106 (e.g., SWD). The AIPL 304 can convert some or all of the signals between the HIPL 302 and MIPL 306 to differential pair signals for robust transmission, for reducing noise impact and for increasing the possible cable length available for use. The AIPL 304 may be a unidirectional communication interface and protocol, such as LVDS. In some implementations, the sender board 502 can convert TTL signals to differential signals and the receiver board 504 can convert the differential signals back to the TTL signals. For example, the sender board 502 can convert the host TTL signals to host differential signals 506 on the wire 412. The sender board 502 can also sense the microcontroller 106 TTL signals, on the wire 412, convert them to differential microcontroller signals 508 and transmit them to the receiver board 504. The receiver board 504 can convert the differential microcontroller signals 508 back to TTL signals to be sensed at the HIPL input pin 404.

Similarly, the AIPL 304 can convert the clock signal to a differential clock signal 510 for robust transmission. For flashing operations, the unidirectional clock signal from the host 202 to the microcontroller 106 is used. The sender board converts the TTL clock signal to a differential clock signal 510. The receiver board 504 converts the differential clock signal back to the TTL clock signal and provides the TTL clock signal to the MIPL 306.

In some embodiments, the host 202 can be implemented as described below.

Example Implementation Mechanism—Hardware Overview

Some embodiments are implemented by a computer system or a network of computer systems. A computer system may include a processor, a memory, and a non-transitory computer-readable medium. The memory and non-transitory medium may store instructions for performing methods, steps and techniques described herein.

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computers, cloud computing computers, desktop computer systems, portable computer systems, handheld devices, networking devices or any other device that incorporates hard-wired and/or program logic to implement the techniques.

Figure 6:
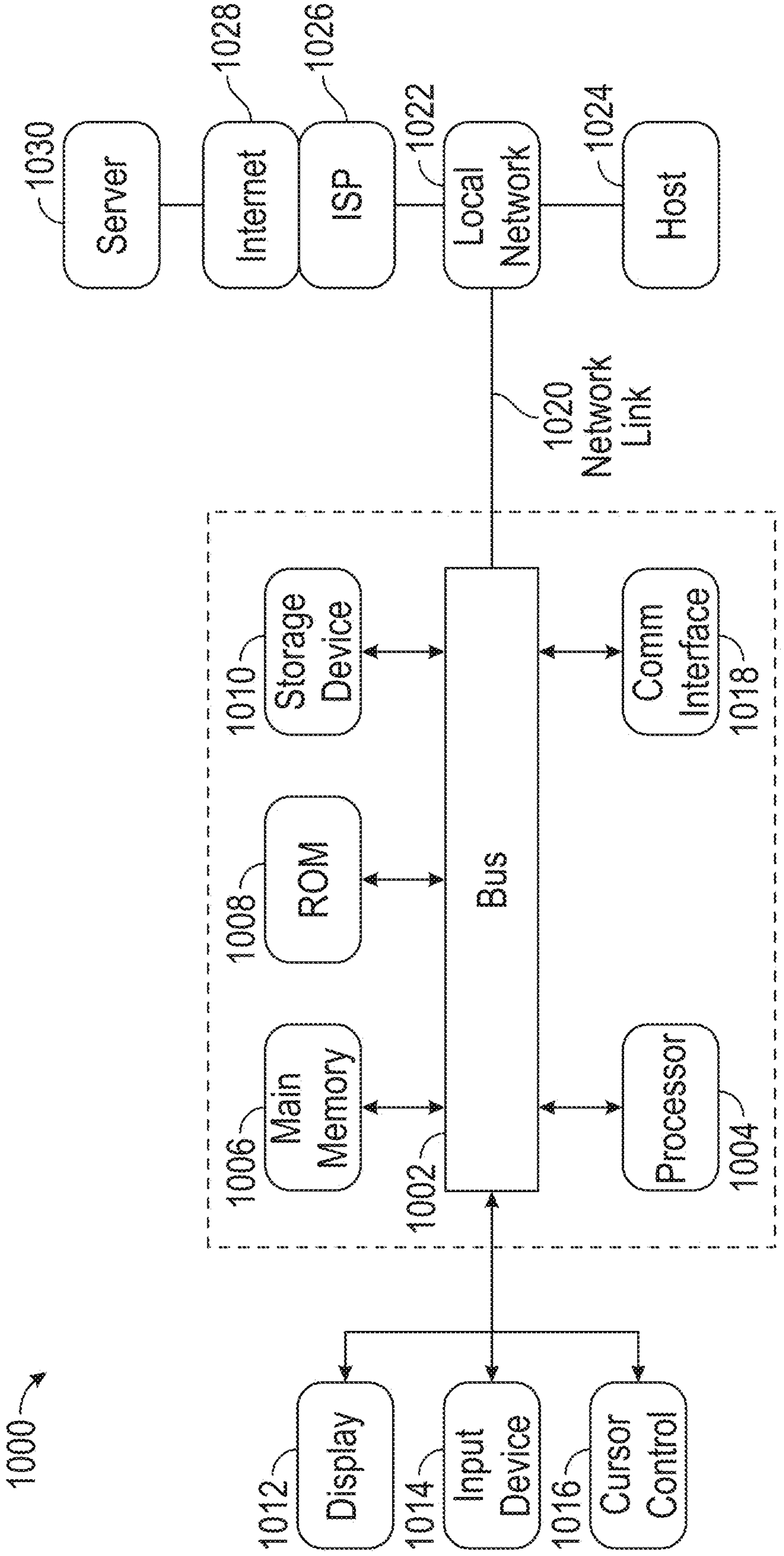
FIG. 6 illustrates an environment in which some embodiments may operate.

For example, FIG. 6 is a block diagram that illustrates a computer system 1000 upon which an embodiment of can be implemented. Computer system 1000 includes a bus 1002 or other communication mechanism for communicating information, and a hardware processor 1004 coupled with bus 1002 for processing information. Hardware processor 1004 may be, for example, special-purpose microprocessor optimized for handling audio and video streams generated, transmitted or received in video conferencing architectures.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid state disk is provided and coupled to bus 1002 for storing information and instructions.

Computer system 1000 may be coupled via bus 1002 to a display 1012, such as a cathode ray tube (CRT), liquid crystal display (LCD), organic light-emitting diode (OLED), or a touchscreen for displaying information to a computer user. An input device 1014, including alphanumeric and other keys (e.g., in a touch screen display) is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the user input device 1014 and/or the cursor control 1016 can be implemented in the display 1012 for example, via a touch-screen interface that serves as both output display and input device.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical, magnetic, and/or solid-state disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution.

EXAMPLES

It will be appreciated that the present disclosure may include any one and up to all of the following examples.

Example 1: A system comprising: a host-side interface and protocol layer (HIPL) microcontroller comprising an HIPL input pin and an HIPL output pin, the HIPL comprising an interface and protocol compatible with communication with a microprocessor, the HIPL output pin coupled with an HIPL transistor, configured to generate a selected high or low voltage on the HIPL output pin; a microprocessor-side interface and protocol layer (MIPL) microcontroller, comprising an input/output MIPL pin, the MIPL comprising the interface and protocol compatible with communication with the microprocessor, the MIPL pin coupled with an MIPL transistor, configured to generate a selected high or low voltage on the MIPL pin; an auxiliary interface and protocol layer (AIPL), the AIPL coupling the HIPL and the MIPL; a diode coupled between the AIPL and the MIPL pin; and a transistor coupled between the positive terminal of the diode and a high voltage.

Example 2: The system of Example 1, wherein the AIPL comprises a sender board and a receiver board, wherein the HIPL is configured to generate a single-ended HIPL signal on the HIPL output pin, wherein the sender board is configured to receive the single-ended HIPL signal and convert the single-ended HIPL signal to a differential HIPL signal, wherein the receiver board is configured to receive the differential HIPL signal and convert the differential HIPL signal to the single-ended HIPL signal, and wherein the receiver board is configured to provide the single-ended HIPL signal to the MIPL pin.

Example 3: The system of any of Examples 1 and 2, wherein the single-ended HIPL signal is a transistor-to-transistor logic (TTL) signal.

Example 4: The system of any of Examples 1-3, wherein the AIPL comprises a sender board and a receiver board, wherein the MIPL pin is coupled with the sender board, wherein the the MIPL is configured to generate a single-ended MIPL signal on the MIPL pin, wherein the sender board is configured to receive the single-ended MIPL signal, convert the single-ended MIPL signal to a differential MIPL signal, and transmit the differential MIPL signal to the receiver board, wherein the receiver board is coupled with the HIPL input pin, and wherein the receiver board is configured to convert the differential MIPL signal to the single-ended MIPL signal and provide the single-ended MIPL signal to the HIPL input pin.

Example 5: The system of any of Examples 1-4, wherein the single-ended MIPL signal is a transistor-to-transistor logic (TTL) signal.

Example 6: The system of any of Examples 1-5, wherein the AIPL comprises a unidirectional communication interface and protocol.

Example 7: The system of any of Examples 1-6, wherein the HIPL and the MIPL comprise bidirectional communication interfaces of open-collector type.

Example 8: The system of any of Examples 1-7, further comprising a host computer, configured to provide flashing and/or debugging instructions to the HIPL.

Example 9: The system of any of Examples 1-8, wherein the HIPL is configured to convert a microprocessor flashing script to a communication protocol compatible with the microprocessor.

Example 10: The system of any of Examples 1-9, wherein the HIPL and MIPL each comprise a single wire debug (SWD) interface and protocol.

Example 11: The system of any of Examples 1-10, wherein the AIPL comprises a low voltage differential signaling (LVDS) interface and protocol.

Example 12: The system of any of Examples 1-11, wherein the AIPL is configured to receive a single-ended, collector-type transistor-to-transistor logic (TTL) signal and convert the TTL signal to a differential signal.

Example 13: A method comprising: providing a host-side interface and protocol layer (HIPL) microcontroller comprising an HIPL input pin and an HIPL output pin, the HIPL comprising an interface and protocol compatible with communication with a microprocessor, the HIPL output pin coupled with an HIPL transistor, configured to generate a selected high or low voltage on the HIPL output pin; providing a microprocessor-side interface and protocol layer (MIPL) microcontroller, comprising an input/output MIPL pin, the MIPL comprising the interface and protocol compatible with communication with the microprocessor, the MIPL pin coupled with an MIPL transistor, configured to generate a selected high or low voltage on the MIPL pin; providing an auxiliary interface and protocol layer (AIPL), the AIPL coupling the HIPL and the MIPL; providing a diode coupled between the AIPL and the MIPL pin; and providing a transistor coupled between the positive terminal of the diode and a high voltage.

Example 14: The method of Example 13, wherein the AIPL comprises a sender board and a receiver board, wherein the HIPL is configured to generate a single-ended HIPL signal on the HIPL output pin, wherein the sender board is configured to receive the single-ended HIPL signal and convert the single-ended HIPL signal to a differential HIPL signal, wherein the receiver board is configured to receive the differential HIPL signal and convert the differential HIPL signal to the single-ended HIPL signal, and wherein the receiver board is configured to provide the single-ended HIPL signal to the MIPL pin.

Example 15: The method of any of Examples 13 and 14, wherein the single-ended HIPL signal is a transistor-to-transistor logic (TTL) signal.

Example 16: The method of any of Examples 13-15, wherein the AIPL comprises a sender board and a receiver board, wherein the MIPL pin is coupled with the sender board, wherein the MIPL is configured to generate a single-ended MIPL signal on the MIPL pin, wherein the sender board is configured to receive the single-ended MIPL signal, convert the single-ended MIPL signal to a differential MIPL signal, and transmit the differential MIPL signal to the receiver board, wherein the receiver board is coupled with the HIPL input pin, and wherein the receiver board is configured to convert the differential MIPL signal to the single-ended MIPL signal and provide the single-ended MIPL signal to the HIPL input pin.

Example 17: The method of any of Examples 13-16, wherein the single-ended MIPL signal is a transistor-to-transistor logic (TTL) signal.

Example 18: The method of any of Examples 13-17, wherein the AIPL comprises a unidirectional communication interface and protocol.

Example 19: The method of any of Examples 13-18, wherein the HIPL and the MIPL comprise bidirectional communication interfaces of open-collector type.

Example 20: The method of any of Examples 13-19, further comprising providing a host computer, configured to provide flashing and/or debugging instructions to the HIPL.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as “identifying” or “determining” or “executing” or “performing” or “collecting” or “creating” or “sending” or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including, hard drives, floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects.

What is claimed is:

1. A system comprising:

a host-side interface and protocol layer (HIPL) microcontroller comprising an HIPL input pin and an HIPL output pin, the HIPL microcontroller comprising an interface and protocol compatible with communication with a microprocessor, the HIPL output pin coupled with an HIPL transistor, configured to generate a selected high or low voltage on the HIPL output pin;

a microprocessor-side interface and protocol layer (MIPL) microcontroller, comprising an input/output MIPL pin, the MIPL microcontroller comprising the interface and protocol compatible with communication with the microprocessor, the MIPL pin coupled with an MIPL transistor, configured to generate a selected high or low voltage on the MIPL pin;

an auxiliary interface and protocol layer (AIPL), the AIPL coupling the HIPL and the MIPL;

a diode coupled between the AIPL and the MIPL pin; and a transistor coupled between a positive terminal of the diode and a high voltage.

2. The system of claim 1, wherein the AIPL comprises a sender board and a receiver board, wherein the HIPL is configured to generate a single-ended HIPL signal on the HIPL output pin, wherein the sender board is configured to receive the single-ended HIPL signal and convert the single-ended HIPL signal to a differential HIPL signal, wherein the receiver board is configured to receive the differential HIPL signal and convert the differential HIPL signal to the single-ended HIPL signal, and wherein the receiver board is configured to provide the single-ended HIPL signal to the MIPL pin.

3. The system of claim 2, wherein the single-ended HIPL signal is a transistor-to-transistor logic (TTL) signal.

4. The system of claim 1, wherein the AIPL comprises a sender board and a receiver board, wherein the MIPL pin is coupled with the sender board, wherein the MIPL is configured to generate a single-ended MIPL signal on the MIPL pin, wherein the sender board is configured to receive the single-ended MIPL signal, convert the single-ended MIPL signal to a differential MIPL signal, and transmit the differential MIPL signal to the receiver board, wherein the receiver board is coupled with the HIPL input pin, and wherein the receiver board is configured to convert the differential MIPL signal to the single-ended MIPL signal and provide the single-ended MIPL signal to the HIPL input pin.

5. The system of claim 4, wherein the single-ended MIPL signal is a transistor-to-transistor logic (TTL) signal.

6. The system of claim 1, wherein the AIPL comprises a unidirectional communication interface and protocol.

7. The system of claim 1, wherein the HIPL microcontroller and the MIPL microcontroller comprise bidirectional communication interfaces of open-collector type.

8. The system of claim 1, further comprising a host computer, configured to provide flashing and/or debugging instructions to the HIPL microcontroller.

9. The system of claim 1, wherein the HIPL is configured to convert a microprocessor flashing script to a communication protocol compatible with the microprocessor.

10. The system of claim 1, wherein the HIPL and MIPL each comprise a single wire debug (SWD) interface and protocol.

11. The system of claim 1, wherein the AIPL comprises a low voltage differential signaling (LVDS) interface and protocol.

12. The system of claim 1, wherein the AIPL is configured to receive a single-ended, collector-type transistor-to-transistor logic (TTL) signal and convert the TTL signal to a differential signal.

13. A method comprising:

providing a host-side interface and protocol layer (HIPL) microcontroller comprising an HIPL input pin and an HIPL output pin, the HIPL microcontroller comprising an interface and protocol compatible with communication with a microprocessor, the HIPL output pin coupled with an HIPL transistor, configured to generate a selected high or low voltage on the HIPL output pin;

providing a microprocessor-side interface and protocol layer (MIPL) microcontroller, comprising an input/output MIPL pin, the MIPL microcontroller comprising the interface and protocol compatible with communication with the microprocessor, the MIPL pin coupled with an MIPL transistor, configured to generate a selected high or low voltage on the MIPL pin;

providing an auxiliary interface and protocol layer (AIPL), the AIPL coupling the HIPL and the MIPL; providing a diode coupled between the AIPL and the MIPL pin; and providing a transistor coupled between a positive terminal of the diode and a high voltage.

14. The method of claim 13, wherein the AIPL comprises a sender board and a receiver board, wherein the HIPL is configured to generate a single-ended HIPL signal on the HIPL output pin, wherein the sender board is configured to receive the single-ended HIPL signal and convert the single-ended HIPL signal to a differential HIPL signal, wherein the receiver board is configured to receive the differential HIPL signal and convert the differential HIPL signal to the single-ended HIPL signal, and wherein the receiver board is configured to provide the single-ended HIPL signal to the MIPL pin.

15. The method of claim 14, wherein the single-ended HIPL signal is a transistor-to-transistor logic (TTL) signal.

16. The method of claim 13, wherein the AIPL comprises a sender board and a receiver board, wherein the MIPL pin is coupled with the sender board, wherein the MIPL is configured to generate a single-ended MIPL signal on the MIPL pin, wherein the sender board is configured to receive the single-ended MIPL signal, convert the single-ended MIPL signal to a differential MIPL signal, and transmit the differential MIPL signal to the receiver board, wherein the receiver board is coupled with the HIPL input pin, and wherein the receiver board is configured to convert the differential MIPL signal to the single-ended MIPL signal and provide the single-ended MIPL signal to the HIPL input pin.

17. The method of claim 16, wherein the single-ended MIPL signal is a transistor-to-transistor logic (TTL) signal.

18. The method of claim 13, wherein the AIPL comprises a unidirectional communication interface and protocol.

19. The method of claim 13, wherein the HIPL and the MIPL comprise bidirectional communication interfaces of open-collector type.

20. The method of claim 13, further comprising providing a host computer, configured to provide flashing and/or debugging instructions to the HIPL.

* * * * *